United States Patent
Peach et al.

(10) Patent No.: US 8,879,919 B2
(45) Date of Patent: Nov. 4, 2014

(54) PHOTONIC COMMUNICATIONS DEVICE WITH AN FM/PM DISCRIMINATOR AND RELATED METHODS

(75) Inventors: Robert C. Peach, Rockledge, FL (US); Charles Middleton, Rockledge, FL (US); Richard DeSalvo, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 135 days.

(21) Appl. No.: 13/228,976

(22) Filed: Sep. 9, 2011

(65) Prior Publication Data

US 2013/0064546 A1    Mar. 14, 2013

(51) Int. Cl.
*H04B 10/12* (2006.01)
*H04B 10/50* (2013.01)
*H04B 10/67* (2013.01)

(52) U.S. Cl.
CPC ............ *H04B 10/676* (2013.01); *H04B 10/506* (2013.01)
USPC ........... 398/141; 398/162; 398/188; 398/196; 398/202

(58) Field of Classification Search
USPC .......................................... 398/140, 182, 202
See application file for complete search history.

(56) References Cited

U.S. PATENT DOCUMENTS

| | | | | |
|---|---|---|---|---|
| 2,121,103 A | | 6/1938 | Seeley | ............................. 250/20 |
| 4,794,351 A | | 12/1988 | Darcie | |
| 5,359,412 A | | 10/1994 | Schulz | ........................... 356/345 |
| 5,377,035 A | * | 12/1994 | Wang et al. | .................... 398/152 |
| 5,710,651 A | * | 1/1998 | Logan, Jr. | ...................... 398/168 |
| 5,859,611 A | | 1/1999 | Lam et al. | |
| 5,940,196 A | | 8/1999 | Piehler et al. | |
| 6,246,500 B1 | * | 6/2001 | Ackerman | ..................... 398/115 |
| 6,256,130 B1 | | 7/2001 | Bulow | |
| 6,256,137 B1 | | 7/2001 | Hironishi | |
| 6,476,957 B1 | | 11/2002 | Ward et al. | |
| 6,594,070 B2 | | 7/2003 | Sugata et al. | |
| 6,643,417 B2 | | 11/2003 | Strutz et al. | |
| 6,697,576 B1 | | 2/2004 | Rollins et al. | ................. 398/159 |
| 7,076,170 B2 | | 7/2006 | Choa | ............................. 398/115 |

(Continued)

FOREIGN PATENT DOCUMENTS

EP    1056228 A2    11/2000

OTHER PUBLICATIONS

Marpaung et al, "A photonic chip based on frequency discriminator for a high performance microwave photonic link", Dec. 2010, Optics Express, vol. 18, No. 26.*

(Continued)

*Primary Examiner* — Ken Vanderpuye
*Assistant Examiner* — David Lambert
(74) *Attorney, Agent, or Firm* — Allen, Dyer, Doppelt, Milbrath & Gilchrist, P.A.

(57) ABSTRACT

A communications device includes a transmitter device having first and second optical sources and generating respective first and second modulated optical carrier signals at first and second optical carrier frequencies based upon an input signal. The communications device also includes an optical waveguide coupled to the transmitter device, and a receiver device coupled to the optical waveguide and including an FM-PM discriminator having a transfer function with a positive slope portion and a negative slope portion so that the first optical carrier frequency is positioned on the positive slope portion and the second optical carrier frequency is positioned on the negative slope portion.

23 Claims, 4 Drawing Sheets

(56) References Cited

U.S. PATENT DOCUMENTS

| | | | |
|---|---|---|---|
| 7,079,780 B1 | 7/2006 | Rollins | 398/198 |
| 7,359,580 B2 | 4/2008 | Darcie et al. | |
| 7,369,715 B2 | 5/2008 | Darcie et al. | |
| 7,555,217 B2 | 6/2009 | Hillis et al. | |
| 7,657,179 B2 | 2/2010 | Mahgerefteh et al. | 398/82 |
| 7,813,654 B1 | 10/2010 | Ng et al. | 398/198 |
| 7,825,364 B1 | 11/2010 | Hillis et al. | |
| 8,059,969 B1 | 11/2011 | Yap | |
| 8,526,817 B2 | 9/2013 | Middleton et al. | |
| 2003/0198477 A1 | 10/2003 | Kuri et al. | |
| 2007/0036552 A1* | 2/2007 | Weaver | 398/136 |
| 2008/0212974 A1 | 9/2008 | Davies et al. | |
| 2009/0214203 A1 | 8/2009 | Hoshida et al. | |
| 2009/0263144 A1 | 10/2009 | McKinney | |
| 2013/0183041 A1 | 7/2013 | Wan et al. | |
| 2013/0188952 A1 | 7/2013 | Peach et al. | |

OTHER PUBLICATIONS

Marpaung et al, "Design and realization of an integrated optical frequency modulation discriminator for a high performance microwave photonic link", Oct. 2010, Telecommunication Engineering group University of twente, Enschede, the Netherlands, pp. 131-134.*

Darcie et al., "Class-B Microwave-Photonic Link Using Optical Frequency Modulation and Linear Frequency Discriminators," Journal of Lightwave Technology, vol. 25, No. 1, Jan. 2007, pp. 157-164.

Wyrwas et al, "Dynamic Range of Frequency Modulated Direct-Detection Analog Fiber Optic Links," Journal of Lightwave Technology, vol. 27, No. 24, Dec. 2009, pp. 5552-5562.

Marpaung et al., "A photonic chip based frequency discriminator for a high performance microwave photonic link," Optics Express, vol. 18, No. 26, Dec. 20, 2010, pp. 27359-27370.

Marpaung et al., "Design and Realization of an Integrated Optical Frequency Modulation Discriminator for a High Performance Microwave Photonic Link," Telecommunications Engineering Group, University of Twente, Enschede, The Netherlands, pp. 131-134.

Yamamoto et al., "Coherent Optical Fiber Transmission Systems," IEEE Journal of Quantum Electronics, vol. QE-17, No. 6, Jun. 1981, pp. 919-935.

Ackerman et al., "Signal-to-Noise Performance of Two Analog Photonic Links Using Different Noise Reduction Techniques," 2007 IEEE, pp. 51-54.

* cited by examiner

# PHOTONIC COMMUNICATIONS DEVICE WITH AN FM/PM DISCRIMINATOR AND RELATED METHODS

GOVERNMENT LICENSE RIGHTS

The U.S. Government has a paid-up license in this invention and the right in limited circumstances to require the patent owner to license others on reasonable terms as provided for by the terms of contract No. FA8650-10-C-7003 awarded by Wright-Patterson Air Force Base Research Lab.

FIELD OF THE INVENTION

The present invention relates to the field of communications, and, more particularly, to radio frequency (RF) and optical communications and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

A typical Extremely High Frequency (EHF), i.e. 30 to 300 GHz, communication system may have some drawbacks. For example, transmission of the signals over coaxial cable may incur large attenuation effects. Moreover, in applications where RF devices are used, the size, weight, and power (SWaP) of the components may increase to undesirable levels. Moreover, downstream receiver processing, such as downconverting, and signal addressing may be difficult.

One approach to these drawbacks in EHF communication systems may comprise the use of optical components for signal processing. An advantage of such systems may comprise the ability to transmit EHF signals from a remote location without the degradation of the signal incumbent in RF applications.

For example, as disclosed in U.S. Pat. No. 5,710,651 to Logan, Jr., an EHF communication system comprises a remote antenna station, a transmitter/receiver station, and an optical fiber coupling the stations together. These stations comprise photodiodes for converting the transmitted optical signal to an electrical signal (receiver station), and lasers paired with optical modulators for converting the received EHF signal to an optical signal (transmitter station).

In optical communication system applications, it may be desirable to maintain a high degree of linearity at EHF ranges, in particular, 30-60 GHz and large instantaneous bandwidth, such as 0.1-4 GHz. These applications typically include the use of an external modulated RF photonic transmit link. One potential limit to performance in these applications is the linearity of the optical intensity modulator.

One approach to this drawback is disclosed by Marpaung et al., "A photonic chip based frequency discriminator for a high performance microwave photonic link," Optics Express, Vol. 18, No. 26. This device includes a single continuous wave (CW) laser, a frequency or phase modulator coupled to the CW laser, a pair of complimentary frequency modulation (FM) discriminators, and a waveguide coupling together the FM discriminators and the modulator. This device provides a wideband signal with linearity improvements. Nevertheless, this device has increased complexity and power consumption since the FM discriminators are thermally controlled.

Another approach is disclosed in U.S. Pat. No. 6,246,500 to Ackerman. This optical link device includes a pair of optical sources, a multiplexer coupled to the optical sources, an intensity modulator (Mach-Zhender modulator) coupled to the multiplexer, and a receiver end coupled to the modulator via a waveguide. This optical device provides 8 dB in dynamic range improvement at 1 GHz, but uses different electro-optic coefficients of the Mach-Zhender modulator and precise photocurrent control to reduce distortion. One potential drawback to this approach is that the needed precise control of the optical carrier intensity and/or polarization may be problematic. Another approach similar to that of Ackerman is disclosed in U.S. Pat. No. 7,079,780 to Rollins. This optical link device uses a low biasing technique, i.e. a narrowband biasing technique.

Yet another approach is disclosed by Darcie et al., "Class-B microwave-photonic link using optical frequency modulation and linear frequency discriminators," Journal of Lightwave Technology, Vol. 25, No. 1. This optical link device includes a pair of complimentary fiber-based linear filters coupled to respective modulators. Nevertheless, this optical link device may provide only narrowband performance and a 3 dB improvement in third order intercept point (OIP3).

SUMMARY OF THE INVENTION

In view of the foregoing background, it is therefore an object of the present invention to provide a communications device with high linearity and less complexity.

This and other objects, features, and advantages in accordance with the present invention are provided by a communications device including a transmitter device comprising first and second optical sources configured to generate respective first and second optical carrier signals at first and second optical carrier frequencies, and a modulator coupled to the first and second optical sources and configured to modulate the first and second optical carrier signals with an input signal. The communications device includes an optical waveguide coupled to the transmitter device, and a receiver device coupled to the optical waveguide. The receiver device includes a frequency modulation-phase modulation (FM-PM) discriminator having a transfer function with a positive slope portion and a negative slope portion so that the first optical carrier frequency is positioned on the positive slope portion and the second optical carrier frequency is positioned on the negative slope portion. The receiver device also includes a first waveguide path coupled to the FM-PM discriminator, a second waveguide path coupled to the FM-PM discriminator, and an optical-to-electrical converter coupled to the first and second waveguide paths and configured to generate an output signal. Advantageously, this communications device has high linearity, high bandwidth, and is less complex as compared to typical approaches.

More specifically, the FM-PM discriminator may comprise a thermally compensated FM-PM discriminator. The communications device may further comprise a controller configured to cause the first and second optical sources to adjust the first and second optical carrier frequencies. The modulator may comprise a phase modulator.

In some embodiments, the receiver device may further comprise a first wavelength division multiplexer (WDM) coupled between the FM-PM discriminator and the first and second waveguide paths. The transmitter device may also comprise a second WDM coupled between the first and second optical sources, and the modulator.

Another aspect is directed to a method of communicating. This method includes generating respective first and second optical carrier signals at first and second optical carrier frequencies, and modulating the first and second optical carrier signals with an input signal. The method also includes receiving the modulated first and second optical carrier signals from an optical waveguide using an FM-PM discriminator having a transfer function with a positive slope portion and a negative slope portion so that the first optical carrier frequency is positioned on the positive slope portion and the second optical carrier frequency is positioned on the negative slope portion. The method also includes generating an output signal with an optical-to-electrical converter coupled to the FM-PM discriminator.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
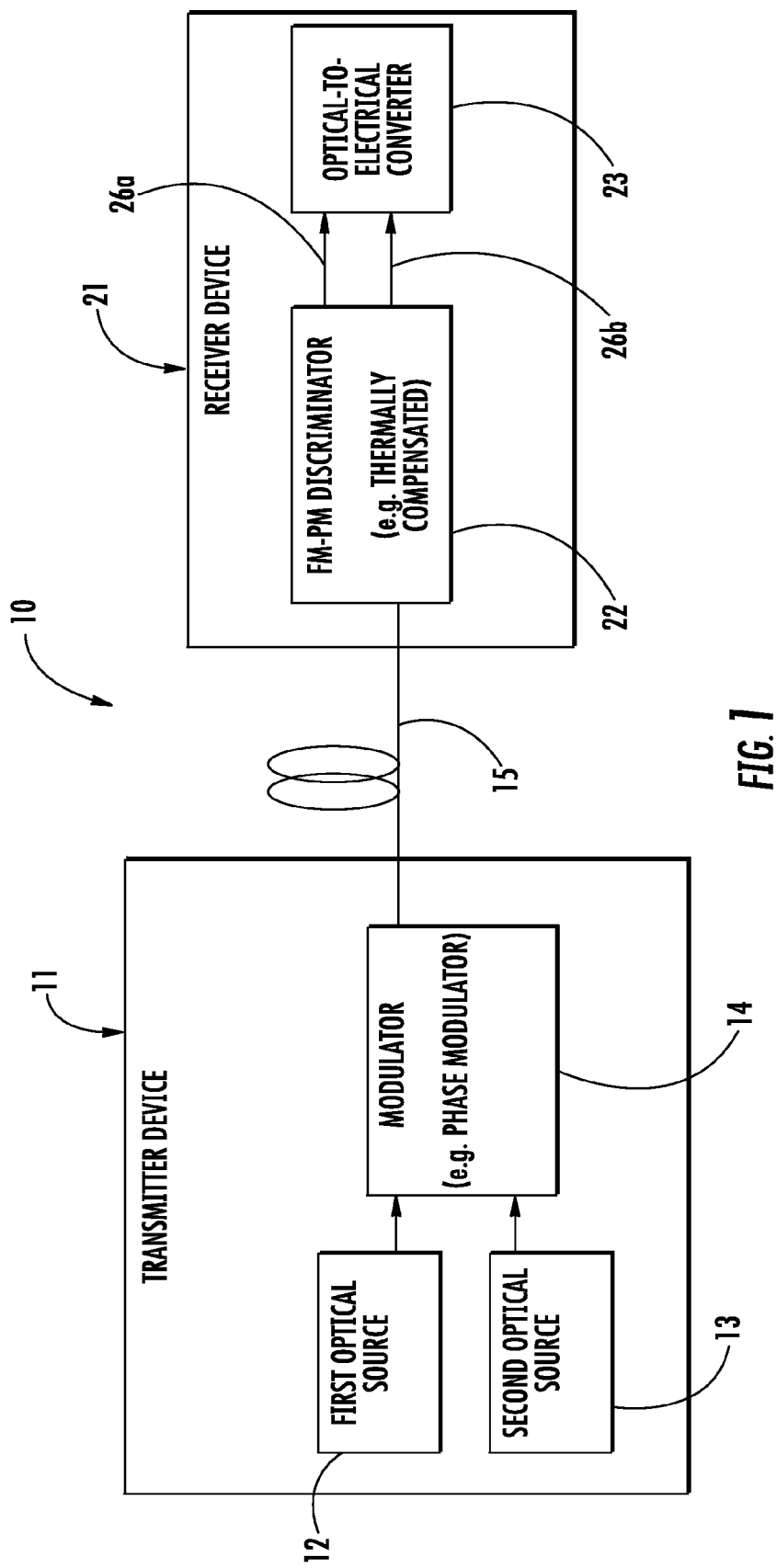
FIG. 1 is a schematic diagram of the communications device, according to the present invention.

Referring initially to FIG. 1, a communications device 10 according to the present invention is now described. The communications device 10 includes a transmitter device 11, a receiver device 21, and an optical waveguide 15 coupling the devices together. The optical waveguide 15 comprises, for example, a fiber optic cable, which may be several kilometers long in remoting applications, such as for EHF communications. The transmitter device 11 includes first and second optical sources 12, 13 configured to generate respective first and second optical carrier signals at first and second optical carrier frequencies. For example, the first and second optical sources 12, 13 may comprise CW lasers.

The transmitter device 11 further includes a modulator 14 coupled to the first and second optical sources 12, 13 and configured to modulate the first and second optical carrier signals with an input signal. In particular, the modulator 14 may comprise a phase modulator. For example, the input signal may be received from an upstream antenna and RF receiver circuitry or may be generated locally for subsequent transmission.

The receiver device 21 includes an FM-PM discriminator 22 having a transfer function with a positive slope portion and a negative slope portion. In some embodiments, the FM-PM discriminator 22 may be thermally compensated as described in Marpaung et al., "A photonic chip based frequency discriminator for a high performance microwave photonic link," Optics Express, Vol. 18, No. 26, the contents of which are hereby incorporated by reference in their entirety. The first and second optical sources 12, 13 are adjusted so that the first optical carrier frequency is positioned on the positive slope portion of the transfer function of the FM-PM discriminator 22, and the second optical carrier frequency is positioned on the negative slope portion of the transfer function of the FM-PM discriminator. In other words, the FM-PM discriminator 22 provides effective complimentary transfer functions for the modulated first and second carrier signal components.

The receiver device 21 includes a first waveguide path 26a coupled to the FM-PM discriminator 22, a second waveguide path 26b coupled to the FM-PM discriminator, and an optical-to-electrical converter 23 coupled to the first and second waveguide paths and configured to generate an output signal. For example, the first and second waveguide paths 26a, 26b may comprise fiber optic cables.

Figure 2:
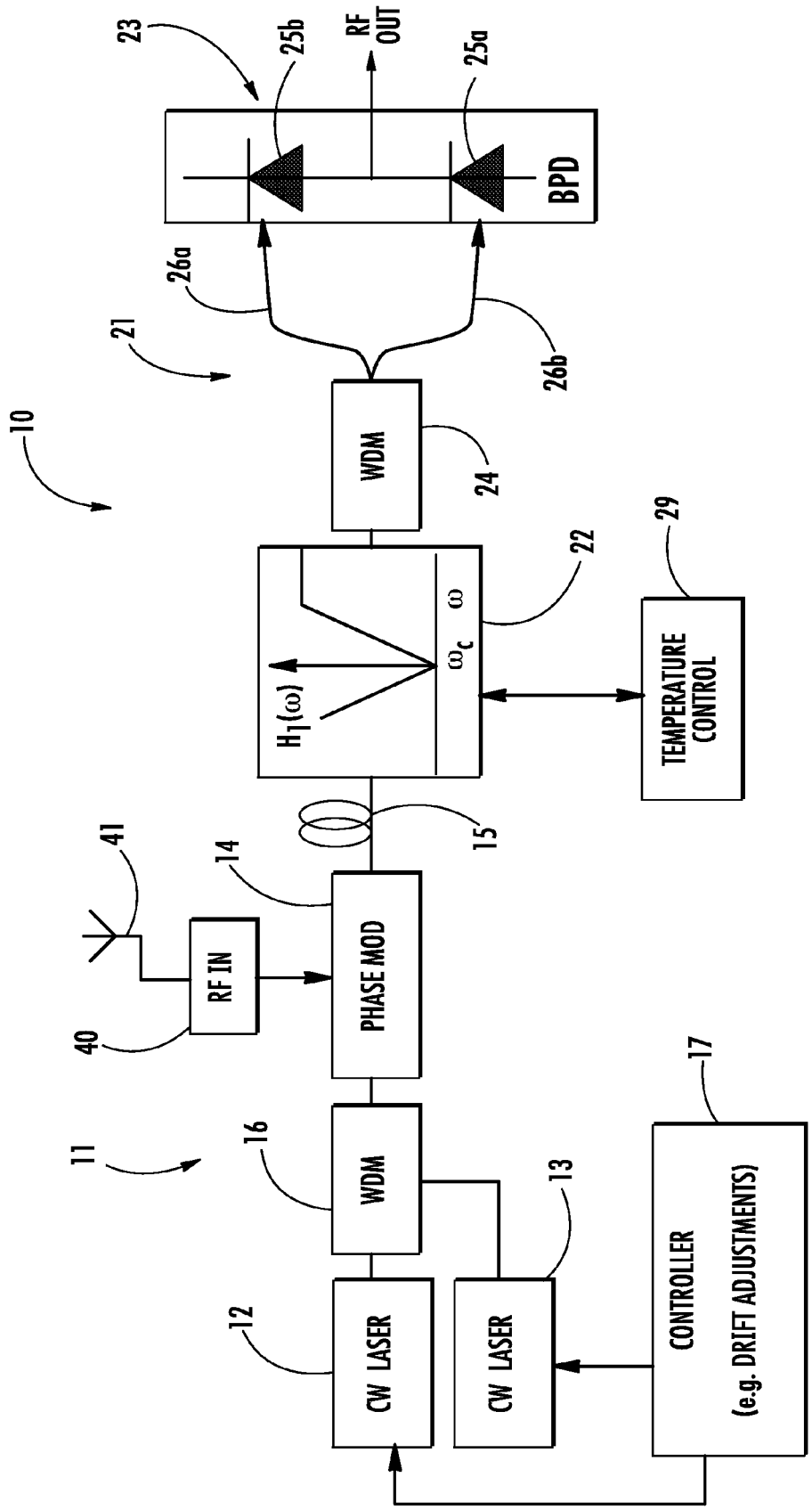
FIG. 2 is a more detailed schematic diagram of the communications device as shown in FIG. 1.

Referring now additionally to FIG. 2, further details of the communications device 10 are now provided. The transmitter device 11 illustratively includes CW lasers as the first and second optical sources 12, 13. Moreover, the transmitter device 11 includes a controller 17 for configuring the first and second optical sources 12, 13 to adjust the first and second optical carrier frequencies to compensate for drift in the transfer function of the FM-PM discriminator 22. Also, the modulator 14 includes a phase modulator.

In this embodiment, the receiver device 21 includes a first WDM 24 coupled between the FM-PM discriminator 22 and the first and second waveguide paths 26a, 26b, and a temperature control block 29 for thermally tuning and holding steady the transfer function of the FM-PM discriminator. The first WDM 24 multiplexes frequency portions of the filtered signal from the FM-PM discriminator 22 to each waveguide path 26a, 26b. In particular, the first WDM 24 passes the frequency signal portion associated with the first optical source 12 to the first waveguide path 26a, and passes the frequency signal portion associated with the second optical source 13 to the second waveguide path 26b.

The transmitter device 11 includes a second WDM 16 coupled between the first and second optical sources 12, 13, and the modulator 14. In other embodiments, the second WDM 16 may include a passive optical coupler. The second WDM 16 multiplexes together the first and second carrier signals from the first and second optical sources 12, 13.

The optical-to-electrical converter 23 illustratively includes a balanced photodiode converter that comprises a pair of photodiodes 25a, 25b. The communications device 10 includes an RF input module 40 coupled to the modulator 14, and an antenna 41 coupled to the RF input module for generating the input signal. In this embodiment, the communications device 10 is implemented for a receiver-to-station remoting operation. Of course, this is an exemplary application and other applications may be implemented, as will be appreciated by the skilled person.

Figure 3:
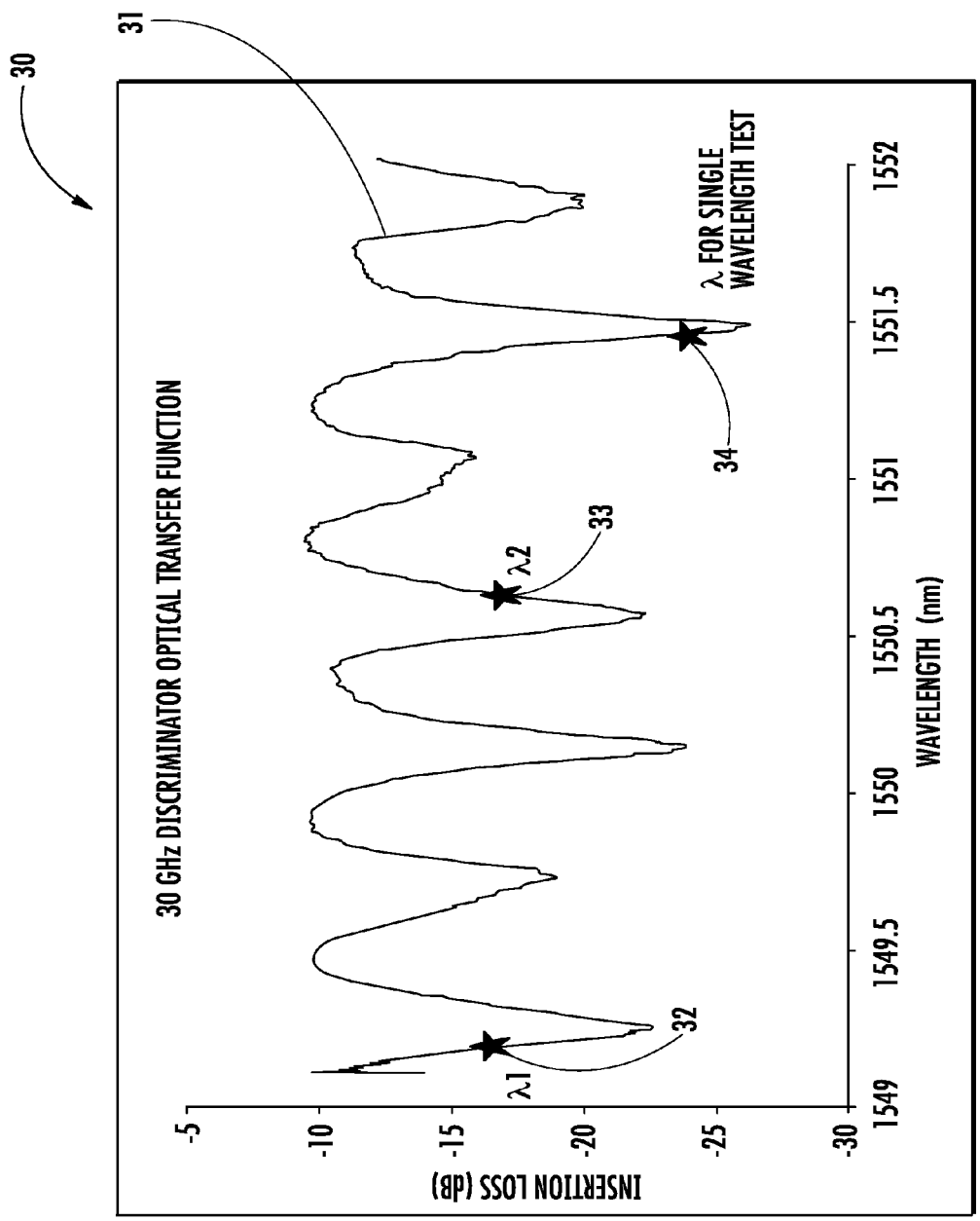
FIG. 3 is a diagram of the transfer function of the FM-PM discriminator from the communications device of FIG. 2.

Referring now additionally to FIG. 3, the graph 30 illustrates an exemplary transfer function 31 for the FM-PM discriminator 22. As shown, the first and second optical carrier frequencies $\lambda_1$, $\lambda_2$ are positioned at respective points 32, 33 on the transfer function 31 such that the signals experience an effective complimentary transfer function, i.e. the wavelengths fall on portions of the transfer function that have near opposite slopes. Also, the wavelength for conducting an effective testing of the FM-PM discriminator 22 with a single wavelength source is also shown at point 34.

As discussed above, this communications device 10 has greater linearity and bandwidth, and is less complex than typical approaches. In particular, as compared to the approach of Marpaung et al., the pair of FM-PM discriminators is now reduced to one, which greatly reduces power consumption and package size. Indeed, over the approach of Marpaung et al., the communications device 10 may provide for a 45% reduction in electrical power consumption. See Table 1, supra. In experimental results, the communications device 10 also may provide for a 10 dB linearity improvement at 6 GHz with 4 GHz of bandwidth.

TABLE 1

|  | Power Consumption (W) | |
| --- | --- | --- |
|  | Linear | Switching |
| 2 Discriminators + 1 Lasers | 25.3 | 14.3 |
| 1 Discriminator + 2 Lasers (WDM) | 13.4 | 7.9 |

Moreover, the first WDM 24 may provide for complimentary output, thereby providing balanced output detection and second order distortion rejection. Also, as compared to the approach of Marpaung et al., the communications device 10 effectively replaces the complex second FM-PM discriminator of Marpaung et al. with a second tunable laser optical source, which is a more mature technology.

Another aspect is directed to a method of communications. This method includes generating respective first and second optical carrier signals at first and second optical carrier frequencies, and modulating the first and second optical carrier signals with an input signal. The method also includes receiving the modulated first and second optical carrier signals from an optical waveguide using an FM-PM discriminator 22 having a transfer function with a positive slope portion and a negative slope portion so that the first optical carrier frequency is positioned on the positive slope portion and the second optical carrier frequency is positioned on the negative slope portion. The method also includes generating an output signal with an optical-to-electrical converter 23 coupled to the FM-PM discriminator 22.

Figure 4:
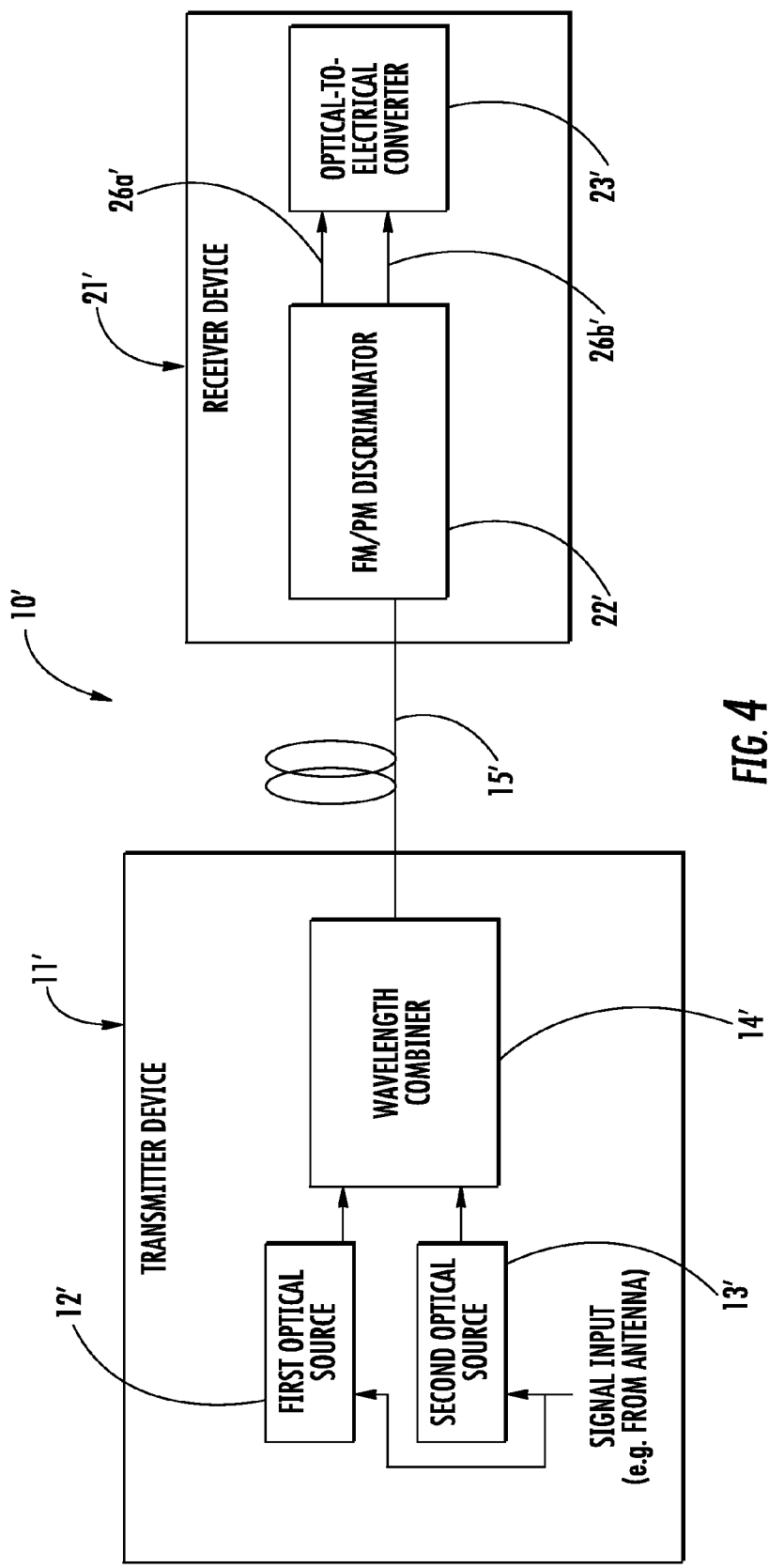
FIG. 4 is a schematic diagram of another embodiment of the communications device, according to the present invention.

Referring now to FIG. 4, another embodiment of the communications device 10' is now described. In this embodiment of the communications device 10', those elements already discussed above with respect to FIG. 1 are given prime notation and most require no further discussion herein. This embodiment differs from the previous embodiment in that the communications device 10' replaces the modulator with a wavelength combiner 14'. For example, the wavelength combiner 14' may comprise a dense wavelength division multiplexer (DWDM). In this embodiment, the first and second optical carrier signals are directly modulated via the first and second optical sources 12'-13'. For example, the power sources to the first and second optical sources 12'-13' may be modulated to effect this operation.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
a transmitter device comprising first and second optical sources configured to generate respective first and second optical carrier signals at first and second optical carrier frequencies, and a modulator coupled to said first and second optical sources and configured to modulate the first and second optical carrier signals with an input signal;
an optical waveguide coupled to said transmitter device; and
a receiver device coupled to said optical waveguide and comprising
a frequency modulation-phase modulation (FM-PM) discriminator having a single integrated transfer function with a positive slope portion and a negative slope portion so that the first optical carrier frequency is positioned on the positive slope portion and the second optical carrier frequency is positioned on the negative slope portion,
a first waveguide path coupled to said FM-PM discriminator,
a second waveguide path coupled to said FM-PM discriminator, and
an optical-to-electrical converter coupled to said first and second waveguide paths and configured to generate an output signal;
said transmitter device comprising a controller configured to compensate for thermal drift in said FM-PM discriminator by adjusting the first and second optical carrier frequencies.

2. The communications device of claim 1 wherein said FM-PM discriminator comprises a thermally compensated FM-PM discriminator.

3. The communications device of claim 1 wherein said modulator comprises a phase modulator.

4. The communications device of claim 1 wherein said receiver device comprises a first wavelength division multiplexer (WDM) coupled between said FM-PM discriminator and said first and second waveguide paths.

5. The communications device of claim 4 wherein said transmitter device comprises a second WDM coupled between said first and second optical sources, and said modulator.

6. The communications device of claim 1 wherein said optical-to-electrical converter comprises a balanced photodiode converter.

7. The communications device of claim 1 further comprising an antenna coupled to said modulator and configured to generate the input signal.

8. A receiver device for receiving a combined modulated optical signal comprising first and second optical carrier frequencies, the combined modulated optical signal being from a transmitter device that compensates for thermal drift by adjusting the first and second optical carrier frequencies, the receiver communications device comprising:
a frequency modulation-phase modulation (FM-PM) discriminator having a single integrated transfer function with a positive slope portion and a negative slope portion so that the first optical carrier frequency is positioned on the positive slope portion and the second optical carrier frequency is positioned on the negative slope portion;
a first waveguide path coupled to said FM-PM discriminator;
a second waveguide path coupled to said FM-PM discriminator; and an optical-to-electrical converter coupled to said first and second waveguide paths and configured to generate an output signal.

9. The receiver device of claim 8 wherein said FM-PM discriminator comprises a thermally compensated FM-PM discriminator.

10. The receiver device of claim 8 wherein the combined modulated signal comprises a phase modulated signal.

11. The receiver device of claim 8 further comprising a wavelength division multiplexer (WDM) coupled between said FM-PM discriminator and said first and second waveguide paths.

12. The receiver device of claim 8 wherein said optical-to-electrical converter comprises a balanced photodiode converter.

13. A communications device comprising:
a transmitter device comprising first and second optical sources configured to generate respective first and second modulated optical carrier signals at first and second optical carrier frequencies and based upon an input signal, and a wavelength combiner coupled to said first and second optical sources and configured to combine the first and second modulated optical carrier signals;
an optical waveguide coupled to said transmitter device; and
a receiver device coupled to said optical waveguide and comprising
a frequency modulation-phase modulation (FM-PM) discriminator having a single integrated transfer function with a positive slope portion and a negative slope portion so that the first optical carrier frequency is positioned on the positive slope portion and the second optical carrier frequency is positioned on the negative slope portion,
a first waveguide path coupled to said FM-PM discriminator,
a second waveguide path coupled to said FM-PM discriminator, and
an optical-to-electrical converter coupled to said first and second waveguide paths and configured to generate an output signal;
said transmitter device comprising a controller configured to compensate for thermal drift in said FM-PM discriminator by adjusting the first and second optical carrier frequencies.

14. The communications device of claim 13 wherein said FM-PM discriminator comprises a thermally compensated FM-PM discriminator.

15. The communications device of claim 13 wherein said wavelength combiner comprises a wavelength division multiplexer (WDM).

16. The communications device of claim 13 wherein said optical-to-electrical converter comprises a balanced photodiode converter.

17. The communications device of claim 13 further comprising an antenna coupled to said first and second optical sources and configured to generate the input signal.

18. A method of communications comprising:
using first and second optical sources for generating respective first and second optical carrier signals at first and second optical carrier frequencies;
modulating the first and second optical carrier signals with an input signal;
receiving the modulated first and second optical carrier signals from an optical waveguide using a frequency modulation-phase modulation (FM-PM) discriminator having a single integrated transfer function with a positive slope portion and a negative slope portion so that the first optical carrier frequency is positioned on the positive slope portion and the second optical carrier frequency is positioned on the negative slope portion;
generating an output signal with an optical-to-electrical converter coupled to the FM-PM discriminator; and
controlling the first and second optical sources for adjusting the first and second optical carrier frequencies to compensate for thermal drift in the FM-PM discriminator.

19. The method of claim 18 further comprising thermally compensating the FM-PM discriminator to have the transfer function.

20. The method of claim 18 further comprising phase modulating the first and second optical carrier signals.

21. A method of receiving a combined modulated signal comprising first and second optical carrier frequencies, the method comprising:
receiving the combined modulated signal with a frequency modulation-phase modulation (FM-PM) discriminator having a single integrated transfer function with a positive slope portion and a negative slope portion so that the first optical carrier frequency is positioned on the positive slope portion and the second optical carrier frequency is positioned on the negative slope portion;
generating an output signal with an optical-to-electrical converter coupled to the FM-PM discriminator; and
controlling first and second optical sources for adjusting the first and second optical carrier frequencies to compensate for thermal drift in the FM-PM discriminator.

22. The method of claim 21 further comprising thermally compensating the FM-PM discriminator to have the transfer function.

23. The method of claim 21 wherein the optical-to-electrical converter comprises a balanced photodiode converter.

* * * * *